(12) United States Patent
Ehrlich et al.

(10) Patent No.: US 9,422,953 B2
(45) Date of Patent: Aug. 23, 2016

(54) FLOW MEASURING DEVICE FOR MEASURING A PARAMETER OF A FLOW FORMED FROM A FLUID

(71) Applicant: SICK Engineering GmbH, Ottendorf-Okrilla (DE)

(72) Inventors: Andreas Ehrlich, Dresden (DE); Mario Kunzelmann, Dresden (DE); Alexander Nerowski, Dresden (DE)

(73) Assignee: SICK ENIGINEERING GMBH, Ottendorf-Okrilla (DE)

( * ) Notice: Subject to any disclaimer, the term of this patent is extended or adjusted under 35 U.S.C. 154(b) by 0 days.

(21) Appl. No.: 14/874,790

(22) Filed: Oct. 5, 2015

(65) Prior Publication Data

US 2016/0103004 A1 Apr. 14, 2016

(30) Foreign Application Priority Data

Oct. 10, 2014 (EP) .................................... 14188387

(51) Int. Cl.
*G01F 1/66* (2006.01)
*F15D 1/00* (2006.01)
(Continued)

(52) U.S. Cl.
CPC ................. *F15D 1/00* (2013.01); *G01F 1/3236* (2013.01); *G01F 1/662* (2013.01); *G01F 1/667* (2013.01); *G01F 15/00* (2013.01)

(58) Field of Classification Search
CPC ............. G01F 1/66; G01F 1/68; G01F 15/00; G01F 1/12; G01F 1/20; G01F 1/06; G01F 1/708

USPC ............... 73/861.05, 861.18, 861.26, 861.84, 73/861.77, 861.87, 204.26, 861.28
See application file for complete search history.

(56) References Cited

U.S. PATENT DOCUMENTS 3,217,539 A * 11/1965 Owen ..................... G01F 1/103
73/861.77
3,301,052 A * 1/1967 Lee .......................... G01F 1/10
73/861.84

(Continued)

FOREIGN PATENT DOCUMENTS

DE 202010015194 U1 2/2011
EP 0741283 A1 11/1996
(Continued)

OTHER PUBLICATIONS

European Search Report regarding EP 14188387.6 received Mar. 26, 2015.

*Primary Examiner* — Jewel V Thompson
(74) *Attorney, Agent, or Firm* — Nath, Goldberg & Meyer; Jerald L. Meyer; Annie J. Kock

(57) ABSTRACT

The invention relates to a flow measuring device for measuring a parameter of a flow formed from a fluid which flows in a main direction of flow in a line, comprising a first line section for conducting the fluid out of the main direction of flow; a second line section for conducting the fluid back into the main direction of flow; a line connection section for connecting the first line section to the second line section; at least one ultrasound device for transmitting and/or receiving ultrasound waves; and an evaluation unit for carrying out a transit-time difference measurement and for determining the parameter, wherein at least one swirl generating unit for generating a swirl is provided which is arranged downstream of the first line section such that the generated swirl is directed in a direction which is opposite to a direction of a swirl present downstream of the first line section and upstream of the swirl generation unit.

8 Claims, 3 Drawing Sheets

Figure 1:
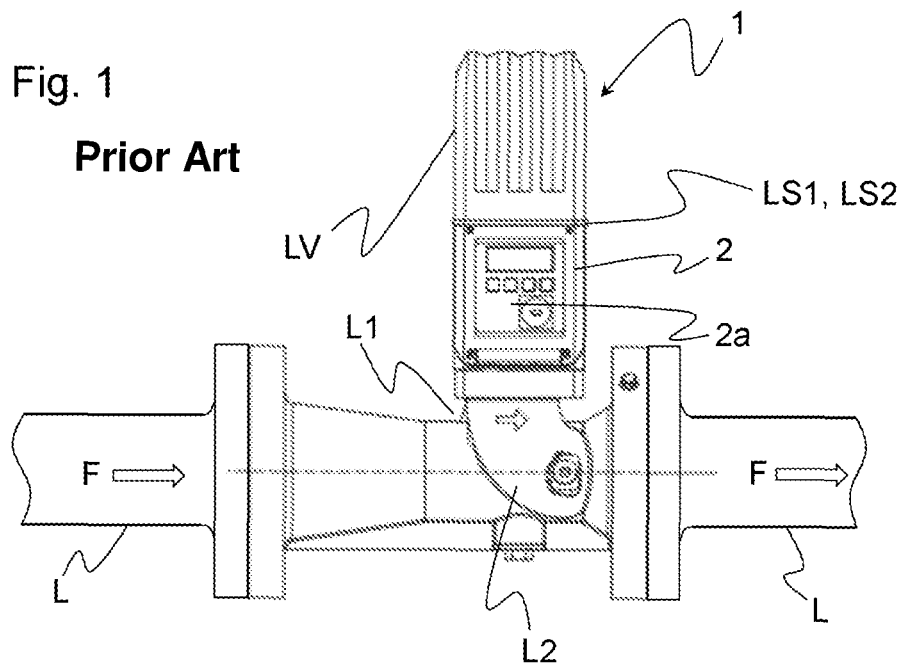

(51) Int. Cl.
*G01F 1/32* (2006.01)
*G01F 15/00* (2006.01)

(56) References Cited

U.S. PATENT DOCUMENTS

| | | | | |
|---|---|---|---|---|
| 3,710,622 A | * | 1/1973 | Hammond | G01F 1/125 |
| | | | | 73/861.84 |
| 3,898,883 A | * | 8/1975 | Kozak | G01F 1/103 |
| | | | | 73/861.33 |
| 3,934,473 A | * | 1/1976 | Griffo | G01F 1/115 |
| | | | | 73/861.84 |
| 4,348,906 A | * | 9/1982 | Feller | G01F 1/10 |
| | | | | 73/861.77 |
| 4,462,264 A | * | 7/1984 | Feller | G01F 1/10 |
| | | | | 73/861.18 |
| 4,590,805 A | * | 5/1986 | Baird | G01F 1/06 |
| | | | | 73/861.77 |
| 4,616,509 A | * | 10/1986 | Feller | G01F 1/056 |
| | | | | 73/861.05 |
| 4,790,195 A | * | 12/1988 | Feller | G01F 1/10 |
| | | | | 73/861.08 |
| 5,668,327 A | * | 9/1997 | Amemori | G01F 1/065 |
| | | | | 73/861.77 |
| 8,448,526 B1 | * | 5/2013 | Feller | G01F 1/075 |
| | | | | 73/861.77 |
| 2005/0284216 A1 | * | 12/2005 | Tanaka | G01F 1/6842 |
| | | | | 73/204.26 |

FOREIGN PATENT DOCUMENTS

| | | |
|---|---|---|
| EP | 1775560 A2 | 4/2007 |
| EP | 1876427 A1 | 1/2008 |

\* cited by examiner

FLOW MEASURING DEVICE FOR MEASURING A PARAMETER OF A FLOW FORMED FROM A FLUID

The invention relates to a flow measuring device for measuring a parameter of a flow formed from a fluid which flows in a main direction of flow in a line.

In addition to various physical principles for determining the flow velocity of the fluid in the line, preferably in a pipe, ultrasound waves are used which are transmitted into the line. Parameters of the flowing fluid and thus of the flow can be determined by means of the transit-time difference method.

In this respect, ultrasound waves are transmitted and received by a pair of ultrasound devices, in particular ultrasonic transducers, wherein the ultrasound devices are arranged mutually opposite at a wall of the line at the ends of a measuring path obliquely to the main direction of flow or to the flow of the fluid.

The ultrasound waves transported through the fluid are accelerated in the direction of flow and are decelerated against the direction of flow. The resulting transit-time difference is calculated using geometrical values to form a mean fluid velocity from which the parameters of the flowing fluid, such as the operating volume flow or the like, are determined.

An important and demanding area of application is represented by gas meters for natural gas pipelines where, due to the huge gas volumes conveyed and to the value of the resource, even the smallest deviations in the measuring precision correspond to very noticeable values. The above-named flow measuring device are used in this field of the measuring of large gas volumes due to their accuracy, their freedom from servicing and their self-diagnosis possibilities in gas transport and gas storage.

Since an ultrasound measuring path only samples the flow velocity at defined positions, ultimately the mean flow velocity over the total flow cross-section is approximated. High accuracies can therefore only be achieved if the flow is easily reproducible or has an undisturbed flow profile or if a plurality of measuring paths are able to resolve the irregularities. To achieve high accuracies, the flow profile can be directly influenced, for example via flow conditioners or long, straight inflow paths. Flow conditioners are, however, only able to homogenize the flow within limits and long, straight inflow paths require a lot of construction space and are not always available. A measurement over a number of measuring paths requires a correspondingly complex measuring device with high production costs.

In addition to ultrasound measuring technology, mechanical turbine flow meters or rotary flow meters are used for gas measuring.

For mechanical measuring, the development of the flow is largely irrelevant so that the disturbance of the original flow and direction of flow can easily be accepted. With ultrasonic transit-time meters, however, it is always endeavored only to install them downstream of a long, and preferably straight, calming path so that the flow can homogenize, and to support this further by flow conditioners. Furthermore, the ultrasonic transit-time meters are also themselves installed and configured such that the fluid can flow as freely and with as little disturbance as possible.

To avoid these restrictions, EP 2 375 224 A1 discloses a flow measuring device in accordance with the preamble of claim 1 in which the fluid is deflected from the main direction of flow in the line into an attachment, for example a stub-like attachment. This is achieved by a special flow guidance which includes a 180° elbow which is in turn rotated about its vertical axis at an angle of 45°. In this manner, the flow can be measured independently of the line sections upstream of the flow measuring device and thus very reproducibly.

A compact flow measuring device can hereby be achieved having a substantially high pre-disturbance resistance of the flow field.

On flowing through the individual elbow sections, the fluid undergoes a plurality of flow deflections which can effect a separation or multiple separations of the fluid from the line wall, so-called separation bubbles. These separation bubbles react very sensitively to upstream changes of a flow field and can influence the downstream flow field.

It is an object of the invention to improve a flow measuring device in accordance with the preamble of claim 1 such that an improved reproducibility of a measurement of different examples of the flow measuring device of the same construction and thus a reduction in the sensitivity thereof with respect to the effects of the separations in the flow can be ensured.

This object is satisfied in accordance with the invention by a flow measuring device having the features of claim 1.

In this respect, the flow measuring device for measuring a parameter of a flow formed from a fluid which flows in a main direction of flow in a line comprises a first line section for conducting the fluid out of the main direction of flow; a second line section for conducting the fluid back into the main direction of flow; a line connection section for connecting the first line section to the second line section; at least one ultrasound device for transmitting and/or receiving ultrasound waves; and an evaluation unit for carrying out a transit-time difference measuring and for determining the parameter, wherein at least one swirl generating unit for generating a swirl is provided which is arranged downstream of the first line section such that the generated swirl is directed in a direction which is opposite to a direction of a swirl present downstream of the first line section and upstream of the swirl generation unit.

The solution in accordance with the invention has the advantage that a reproducibility of the flow upstream of the measurement point is improved due to a simple and inexpensive change within the flow meter device. In addition an improved homogenization of the flow field can be simply achieved.

In accordance with a preferred embodiment, the swirl generation unit comprises a cylindrical housing and a plurality of blades arranged in the interior of the housing, wherein the blades are fixed in position opposite the housing.

In accordance with a further preferred embodiment, the swirl generation unit is arranged downstream of the first line section and upstream of the line connection section.

In accordance with a further preferred embodiment, the ultrasound device is arranged downstream of the swirl generation unit in the direction of flow of the fluid.

In accordance with a further preferred embodiment, the line connection section is configured as a 180° elbow and forms, together with a first line piece and a second line piece, a U-shaped passage, wherein the first straight line piece is located between the first straight line section and the line connection section and the second straight line piece is located between the line connection section and the second line section.

In accordance with a further preferred embodiment, the swirl generation unit is arranged in the first straight line piece and the ultrasound device is arranged in the second straight line piece.

In accordance with a further preferred embodiment, the U-shaped passage is fastened releasably from the first line section and from the second line section. It is advantageous for this purpose to separate the part of the flow measuring device having the swirl generation unit and the ultrasound device quickly and simply from the purely fluid-conducting parts of the flow measuring device to replace the swirl generation unit or the ultrasound device as required.

In accordance with a further preferred embodiment, the swirl generation unit is configured to direct the fluid against the inner wall of the straight first line piece.

Preferred embodiments and further developments as well as further advantages of the invention can be seen from the dependent claims, from the following description and from the drawings.

Figure 1A:
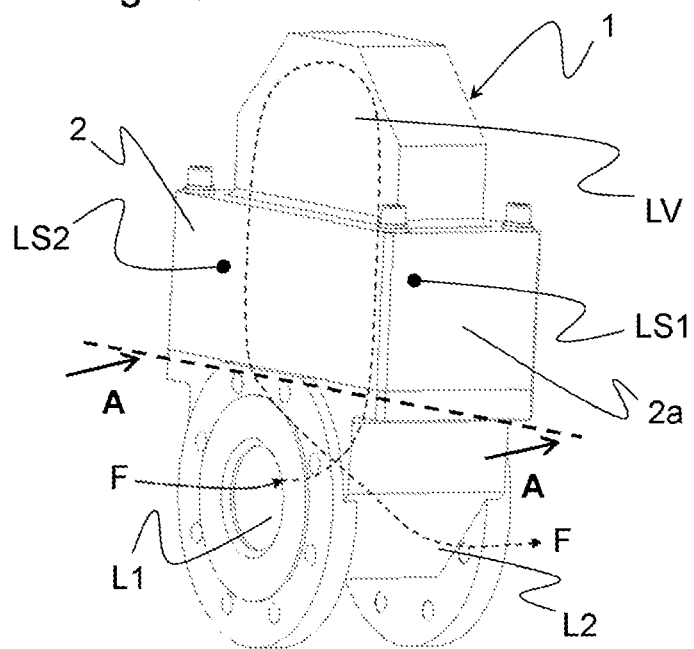
Figure 2:
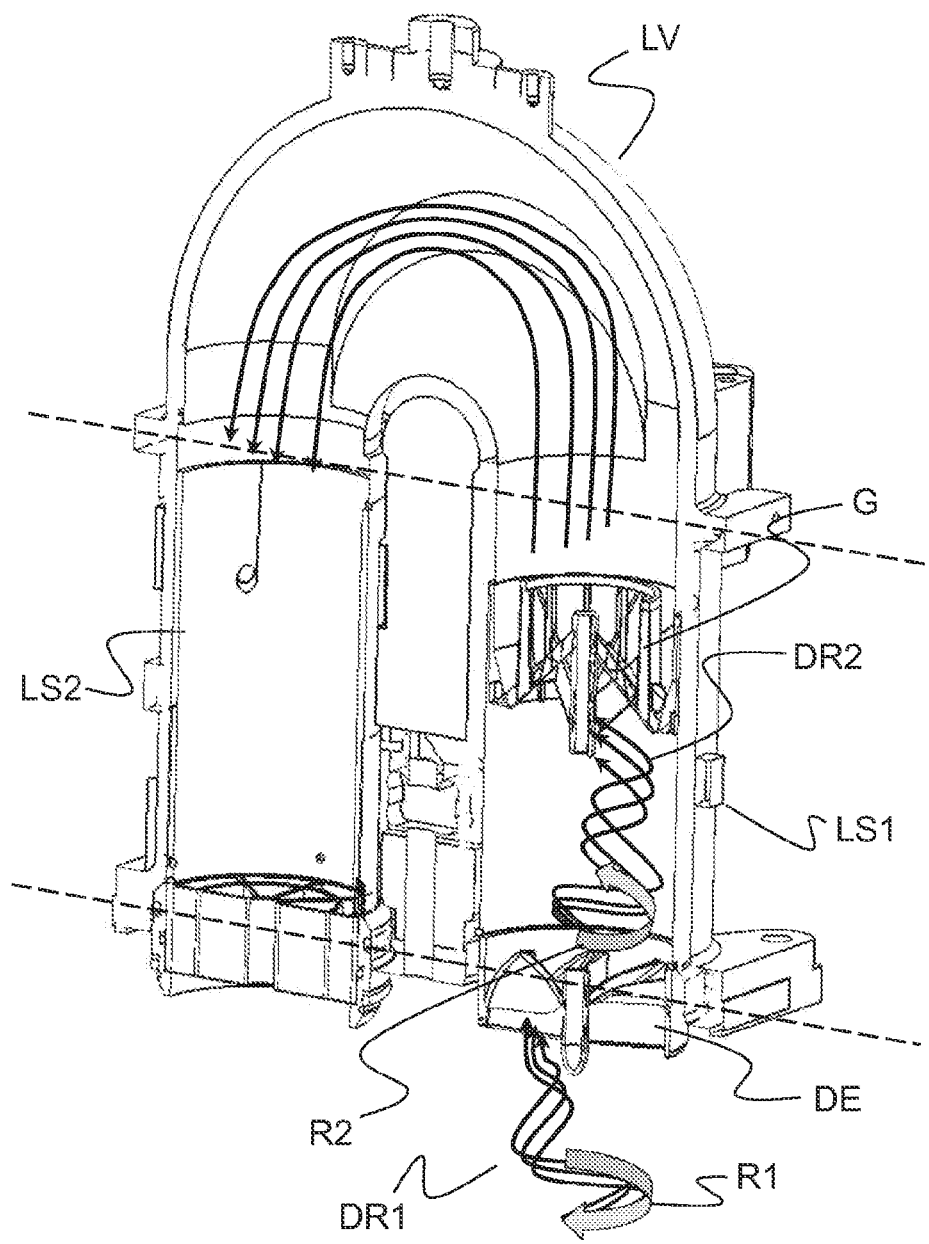
Figure 3:
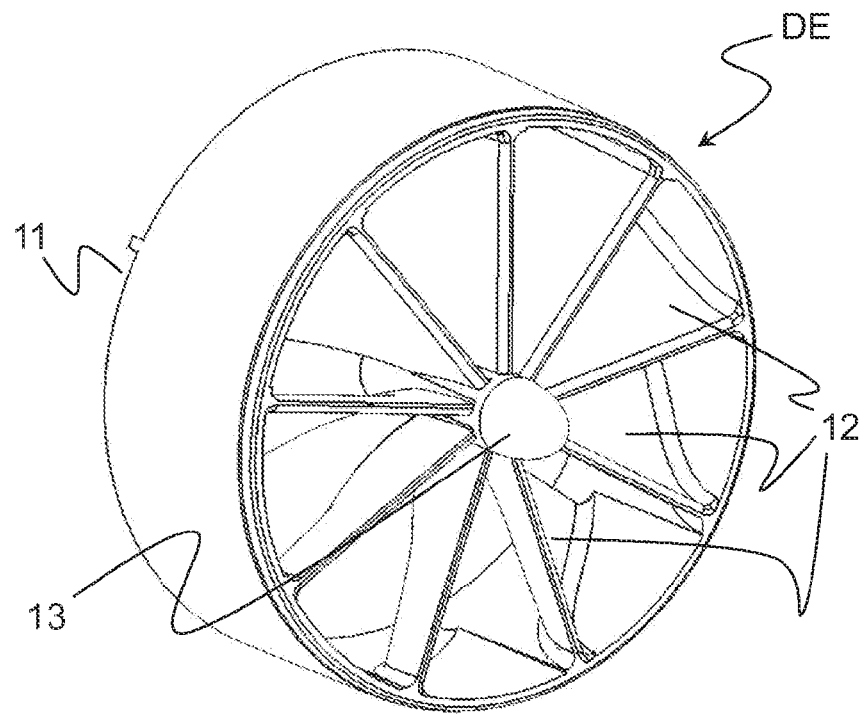
Figure 3A:
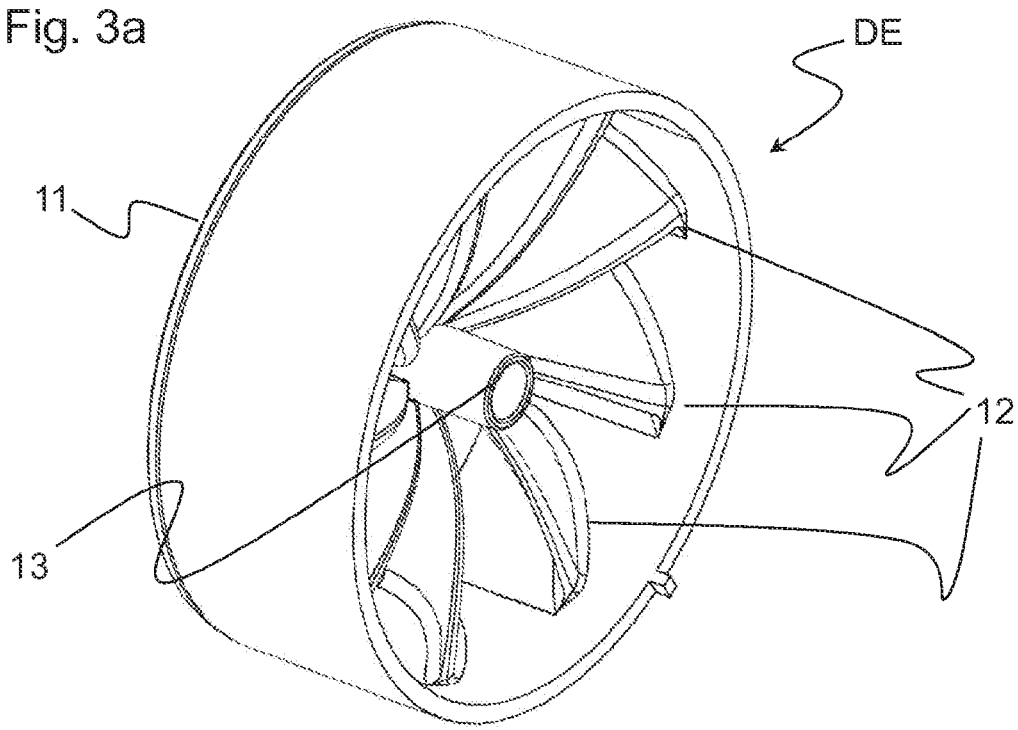

The invention will be explained in detail in the following with reference to embodiments and to the drawing. There are shown in the drawing:

FIG. 1 a schematic representation of a known flow measuring device in the operating state;

FIG. 1a a three-dimensional outside view of the known flow measuring device in accordance with FIG. 1;

FIG. 2 a three-dimensional longitudinal sectional view along the plane A-A of a flow measuring device in accordance with the invention without the inlet sections or outlet sections;

FIG. 3 a three-dimensional front view of a preferred embodiment of a swirl generation unit in accordance with the invention; and FIG. 3a a three-dimensional rear view of the swirl generation unit in accordance with FIG. 3.

A schematic arrangement of a known flow measuring device 1 in a fluid line L is shown in FIG. 1 to determine parameters of a flow formed from a fluid F and located in the line L in the operating state.

The flow measuring device 1 comprises a first line section L1 and a second line section L2. The first line section L1 conducts the inflowing fluid F from the main direction of flow into the flow measuring device 1 and thus essentially serves as an inlet section of the flow measuring device 1. The second line section L2 conducts the flowing fluid F from the flow measuring device 1 back into the main direction of flow in the line L and thus essentially serves as an outlet section of the flow measuring device 1.

A line connection section LV serves to connect the first line section L1 to the second line section L2. In this respect, the line connection section LV is preferably formed as a 180° elbow and forms, together with a first straight line piece LS1 and a second straight line piece LS2, which will be described in more detail in the following, a U-shaped passage of the flow measuring device 1.

During the flow of the fluid F from the main direction of flow out of the line L through the flow measuring device 1 and back into the main direction of flow in the line L again, the parameters of the fluid F or of the flow are determined by at least one ultrasound device 2, which is located at an oppositely disposed side from a shown evaluation unit 2a and at an inner wall of the second straight line piece LS2 and which transmits and/or receives ultrasound waves and whose evaluation unit 2a carries out a transit-time difference measurement. The ultrasound device 2 is in particular arranged at the second straight line piece LS2 of the U-shaped passage so that the flow of the fluid can homogenize upstream of a so-called measuring path in which the ultrasound device 2 is provided to minimize disturbances of the measurement, in particular of the measuring accuracy.

The flow of the fluid F through the flow measuring device 1 will be explained in more detail with reference to FIG. 1a. In this respect, FIG. 1a shows a three-dimensional outside view of the known flow measuring device 1.

The flow of the fluid F through the flow measuring device 1 is shown schematically with reference to the arrow lines.

In the first line section L1, the fluid F is deflected by 90° laterally out of the main direction of flow present in the line L. Instantaneously after the deflection, the fluid F is conducted upwardly in the first strain line piece LS1 perpendicular to the main direction of flow. In this respect, the fluid F carries out a spiral movement, starting from the entry into the first line section L1 up to the exit from the first line section L1.

After flowing through the first straight line piece LS1, the fluid F is deflected in the 180° elbow of the line connection section LV in the opposite direction in which it flows through the second straight line piece LS2, wherein the second straight line piece LS2 is arranged in parallel with the first straight line piece LS1 so that the first and second straight line pieces LS1 and LS2, together with the 180° elbow of the line connection section LV, form the U-shaped passage of the flow measuring device 1.

Downstream of the second straight line piece LS2, the fluid F flows into the second line section LS2 and is likewise conducted back in the main direction of flow into the line L again in a spiral movement.

A swirl DR1 forms in the flow of the fluid F by the multiple deflection of the flow of the fluid F in the first line section L1 of the flow measuring device 1 and in particular by the spiral movement of the fluid F after the exit thereof from the first line section L1.

The multiple deflection, and in particular the swirl DR1 present downstream of the first line section L1, in particular effects the formation of a separation bubble, not shown, at the inside inner wall of the first line piece LS1 directly downstream of the first line section LS1 and at the inside inner wall of the second line piece LS2 directly downstream of the line connection section LV.

As shown in FIG. 2, in accordance with the invention, at least one swirl generation unit DE for generating a swirl DR2 upstream of the conditioner G is provided. The conditioner G serves inter alia as a swirl breaker and provides that a flow which is as homogeneous as possible is present where the measuring paths are set up. In this respect, FIG. 2 shows a three-dimensional longitudinal sectional view along the plane A-E of the flow measuring device 1 in accordance with the invention without the first and second line sections L1 and L2.

In accordance with the shown embodiment, the swirl generation unit DE is provided downstream of the first line section L1 and upstream of the line connection section LV, in particular at the transition between the first line section L1 and the first straight line piece LS1.

The swirl generation unit DE is arranged in accordance with the invention downstream of the first line section L1 such that the generated swirl DR2 is directed in a direction R2 which is opposite to a direction R1 of the swirl DR1 present downstream of the first line section L1 and upstream of the swirl generation unit DE.

I.e. the direction R1 of the swirl DR1 present downstream of the first line section L1 in a clockwise direction is clear in the shown preferred embodiment. This direction R1 of the present swirl DR1 is reversed and directed in the opposite direction by the arrangement of the swirl generation unit DE in accordance with the invention such that the generated swirl DR2 has a counter-clockwise direction R2.

A separation bubble or separation bubbles are hereby prevented or eliminated.

The ultrasound device 2 is preferably arranged downstream of the swirl generation unit DE in the direction of flow of the fluid F in the second straight line piece LS2. The flow is thereby advantageously homogenized along the measuring path upstream of the ultrasound device 2 and is liberated or depleted from the separations disturbing the measuring behavior of the flow measuring device 1.

The swirl generation unit DE is thus preferably arranged in the first straight line piece LS1 and the ultrasound device 2 is thus preferably arranged in the second straight line piece LS2.

The swirl generation unit DE comprises a cylindrical housing 11 and a plurality of blades 12 arranged in the interior of the housing 11, as shown in FIGS. 3 and 3a.

In this respect, the blades 12 are fixed in position with respect to the housing 11 such that the blades 12 take up the present swirl DR1 of the flow on exiting the first line section L1 and in accordance with the invention reverses it in accordance with the orientation of the blades 12 in the direction R2 opposite to the original direction R1. The swirl DR2 is thereby generated with the opposite direction R2 downstream of the swirl generation unit DE.

The blades 12 are connected to one another by a hub 13 at the center of the cylindrical housing 11. The hub 13 projects from the cylindrical housing 11 into the flow of the fluid F such that the hub 13 would come into contact with the fluid F first.

The hub 13 with the blades 12 thus substantially corresponds to a stator of a turbine or the swirl generation unit DE acts as a swirl generator.

Furthermore, the swirl generation unit DE is configured in dependence on a flow condition of the fluid F in the line L. I.e., in particular on the basis of a flow rate, of a pressure, of an aggregate state of the flowing fluid F and/or of an installation of the flow measuring device 1 in the line L, the corresponding swirl generation unit DE is configured such that the shape of the blades 12 and/or the number of the blades 12 is/are selected.

FIG. 3a shows a three-dimensional rear view of a preferred embodiment of a swirl generation unit DE in accordance with the invention which has nine blades 12 such that the cylindrical housing 11 is divided into nine segments.

The number of blades 12 and the size of the swirl generation unit DE is advantageously adaptable to the size of the flow measuring device 1.

Furthermore, in accordance with a preferred embodiment, the U-shaped passage of the flow measuring device 1 comprising the line connection section LV and the two straight first and second line pieces LS1 and LS2 is fastened releasably from the first line section L1 and from the second line section L2.

The U-shaped passage of the flow measuring device 1 or the region of the flow measuring device 1 influencing and measuring the flow profile can thereby be simply separated from the wear-free first and second line sections L1 and L2 so that a maintenance, a repair or a replacement of the U-shaped passage of the flow measuring device 1 can be carried out simply and inexpensively.

The swirl generation unit DE can furthermore be installed into and deinstalled from the flow measuring device 1 in a simple manner.

REFERENCE NUMERAL LIST 1 flow measuring device
2 ultrasound device
2a evaluation unit
11 cylindrical housing
12 blades
13 hub
DE swirl generation unit
DR1 present swirl
DR2 generated swirl
F fluid
G conditioner
L1 first line section/inlet section
L2 second line section/outlet section
LV line connection section
LS1 first straight line piece
LS2 second straight line piece
R1, R2 direction of swirl

The invention claimed is:

1. A flow measuring device for measuring a parameter of a flow formed from a fluid which flows in a main direction of flow in a line, comprising
    a first line section for conducting the fluid out of the main direction of flow;
    a second line section for conducting the fluid back into the main direction of flow;
    a line connection section for connecting the first line section to the second line section;
    at least one ultrasound device for transmitting and/or receiving ultrasound waves;
    an evaluation unit for carrying out a transit-time difference measurement and for determining the parameter, and
    at least one swirl generation unit for generating a swirl which is arranged downstream of the first line section such that the generated swirl is directed in a direction which is opposite to a direction of a swirl present downstream of the first line section and upstream of the swirl generation unit.

2. The flow measuring device in accordance with claim 1, wherein the swirl generation unit comprises a cylindrical housing and a plurality of blades arranged in the interior of the housing, with the plurality of blades being fixed in position with respect to the housing.

3. The flow measuring device in accordance with claim 1, wherein the swirl generation unit is arranged downstream of the first line section and upstream of the line connection section.

4. The flow measuring device in accordance with claim 1, wherein the at least one ultrasound device is arranged downstream of the swirl generation unit in the direction of flow of the fluid.

5. The flow measuring device in accordance with claim 1, wherein the line connection section is configured as a 180° elbow and together with a first straight line piece and a second straight line piece forms a U-shaped passage, with the first straight line piece being located between the first line section and the line connection section and the second straight line piece being located between the line connection section and the second line section.

6. The flow measuring device in accordance with claim 5, wherein the swirl generation unit is arranged in the first straight line piece and the at least one ultrasound device is arranged in the second straight line piece.

7. The flow measuring device in accordance with claim 5, wherein the U-shaped passage is fastened releasable from the first line section and from the second line section.

8. The flow measuring device in accordance with claim 1, wherein the swirl generation unit is configured to direct the fluid against the inner wall of the first straight line piece.

* * * * *